(12) United States Patent
Böttcher et al.

(10) Patent No.: US 11,953,261 B2
(45) Date of Patent: Apr. 9, 2024

(54) FOOD TREATMENT DEVICE

(71) Applicant: BSH Hausgeräte GmbH, Munich (DE)

(72) Inventors: Christian Böttcher, Traunstein (DE); Andreas Kaiser, Halfing (DE); Markus Kuchler, Gstadt am Chiemsee (DE)

(73) Assignee: BSH Hausgeräte GmbH, Munich (DE)

( * ) Notice: Subject to any disclaimer, the term of this patent is extended or adjusted under 35 U.S.C. 154(b) by 848 days.

(21) Appl. No.: 16/756,506

(22) PCT Filed: Oct. 16, 2018

(86) PCT No.: PCT/EP2018/078163
§ 371 (c)(1),
(2) Date: Apr. 16, 2020

(87) PCT Pub. No.: WO2019/081261
PCT Pub. Date: May 2, 2019

(65) Prior Publication Data
US 2021/0199369 A1  Jul. 1, 2021

(30) Foreign Application Priority Data
Oct. 26, 2017  (DE) .......................... 102017219286.0

(51) Int. Cl.
| | | |
|---|---|---|
| F25D 23/12 | (2006.01) | |
| A23L 3/00 | (2006.01) | |
| A23L 3/365 | (2006.01) | |
| A23L 5/10 | (2016.01) | |
| F24C 1/04 | (2021.01) | |

(Continued)

(52) U.S. Cl.
CPC .............. *F25D 23/12* (2013.01); *A23L 3/001* (2013.01); *A23L 3/365* (2013.01); *A23L 5/15* (2016.08);
(Continued)

(58) Field of Classification Search
CPC .......... H05B 6/686; H05B 6/62; H05B 6/647; H05B 6/688; F25D 23/12; A23L 3/365; A23L 5/15; F24C 7/085
See application file for complete search history.

(56) References Cited

U.S. PATENT DOCUMENTS

| | | | |
|---|---|---|---|
| 3,823,295 A | 7/1974 | Simon et al. | |
| 4,884,626 A * | 12/1989 | Filipowski | F25D 23/12 |
| | | | 165/265 |

(Continued)

FOREIGN PATENT DOCUMENTS

| | | | | |
|---|---|---|---|---|
| DE | 10117937 A1 * | 12/2002 | ............... | A21B 3/04 |
| DE | 10117937 A1 | 12/2002 | | |

(Continued)

*Primary Examiner* — Frantz F Jules
*Assistant Examiner* — Martha Tadesse
(74) *Attorney, Agent, or Firm* — Michael E. Tschupp; Andre Pallapies; Brandon G. Braun

(57) ABSTRACT

A food treatment appliance includes a thermally insulated food treatment chamber, a refrigeration unit, a microwave generation facility configured to introduce microwaves with an associated microwave frequency into the food treatment chamber, and a low-frequency generation facility configured to introduce into the food treatment chamber low-frequency waves with a frequency which is lower than the microwave frequency.

19 Claims, 1 Drawing Sheet

(51) Int. Cl.
*F24C 7/08* (2006.01)
*H05B 6/50* (2006.01)
*H05B 6/62* (2006.01)
*H05B 6/64* (2006.01)
*H05B 6/68* (2006.01)

(52) U.S. Cl.
CPC .............. *F24C 7/085* (2013.01); *H05B 6/50* (2013.01); *H05B 6/62* (2013.01); *H05B 6/647* (2013.01); *H05B 6/686* (2013.01); *A23V 2002/00* (2013.01)

(56) References Cited

U.S. PATENT DOCUMENTS

| | | | |
|---|---|---|---|
| 6,764,702 B1 | 7/2004 | Per et al. | |
| 2004/0232140 A1 | 11/2004 | Kanzaki et al. | |
| 2004/0251251 A1* | 12/2004 | Lee | H05B 6/6405 219/752 |
| 2005/0051541 A1 | 3/2005 | Kim | |
| 2011/0114633 A1* | 5/2011 | Niklasson | H05B 6/686 219/704 |
| 2013/0119054 A1 | 5/2013 | Ben-Shmuel et al. | |
| 2019/0014624 A1 | 1/2019 | Westin et al. | |

FOREIGN PATENT DOCUMENTS

| | | | |
|---|---|---|---|
| DE | 102014106031 A1 | 10/2015 | |
| EP | 0066632 A1 | 12/1982 | |
| JP | 2005030713 A * | 2/2005 | .............. F24C 7/008 |
| WO | 2004091260 A1 | 10/2004 | |
| WO | 2013078325 A1 | 5/2013 | |
| WO | 2015025519 A1 | 2/2015 | |

* cited by examiner

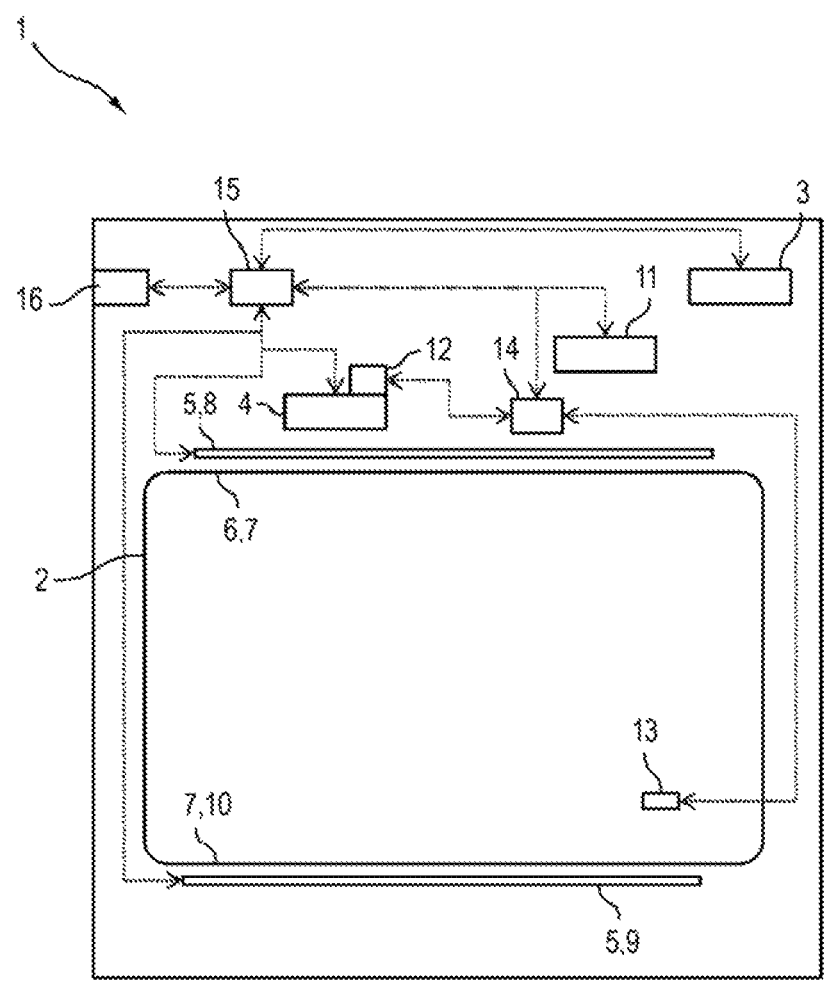

FOOD TREATMENT DEVICE

CROSS-REFERENCES TO RELATED APPLICATIONS

This application is the U.S. National Stage of International Application No. PCT/EP2018/078163, filed Oct. 16, 2018, which designated the United States and has been published as International Publication No. WO 2019/081261 A1 and which claims the priority of German Patent Application, Serial No. 10 2017 219 286.0, filed Oct. 26, 2017, pursuant to 35 U.S.C. 119(a)-(d).

BACKGROUND OF THE INVENTION

The invention relates to a food treatment appliance, having a food treatment chamber, a refrigeration unit for cooling the food treatment chamber and at least one first function unit for treating food in the food treatment chamber. The invention also relates to a method for operating a food treatment appliance. The invention can be applied particularly advantageously to household appliances.

A microwave appliance with an integrated blast chiller and refrigerator function from the FRIGONDA company is known. If frozen food is to be defrosted, the appliance's microwave generation facility known in principle is used for the purpose. However it is disadvantageous that defrosting takes a relatively long time, consumes a lot of energy and the food is also treated in a locally uneven manner. It may even be that some regions of the food have not yet defrosted, while other regions have already been cooked.

SE 1650029 A1 discloses a heating apparatus for defrosting/heating a perishable dielectric load. The heating apparatus comprises: a heating chamber for holding the perishable dielectric load while it is being defrosted/heated, a transmitter unit, which generates electromagnetic energy with predefined spectral properties, an emitting element, which generates an electromagnetic field in the perishable dielectric load based on the electromagnetic energy from the transmission unit, a tuning circuit, which sets a total impedance of the emitting element, the tuning circuit and the heating chamber so that the total impedance corresponds to an output impedance of the transmission unit, and a control unit for measuring the total impedance as the perishable dielectric load is being defrosted/heated, and repeated generation of at least one control signal, which causes the tuning circuit to tailor the total impedance to the output impedance of the transmitter unit. The control unit sets an initial value for the at least one control signal based on an estimation of a volume of the perishable dielectric load.

DE112014003833 T5 discloses a heating apparatus for defrosting frozen food by heating. The heating apparatus contains a heating chamber, in which a food is arranged, a steam generator for supplying steam to the heating chamber to form a film of water on the surface of the food, a magnetron for supplying microwaves to the heating chamber to apply dielectric heating to the food, and a control unit for controlling the steam generator and the magnetron. The control unit carries out the first step of operating the steam generator and the second step of operating the steam generator and the magnetron after the first step. As a frozen food is being defrosted and heated it is possible to improve microwave absorption efficiency over the entire surface of the food by supplying steam to the heating chamber to form an adequate film of water over the entire surface of the food. Even defrosting and heating should be achieved as a result, without uneven heating.

DE 699 33 944 T2 discloses a method for defrosting frozen food in a microwave oven, which comprises a microwave source, an oven cavity and a control unit, the method comprising the steps of supplying the control unit with an input signal containing information about the weight of the food to control defrosting; wherein the control unit causes the microwave source to supply microwaves, which have an average power of more than 400 W, preferably more than 600 Watt and advantageously more than 800 W, to the oven cavity during a first time interval, during which the total microwave energy supplied to the oven cavity exceeds 50 J per gram of food, preferably 80 J per gram of food and advantageously 120 J per gram of food; the control unit causes the microwave source to be switched off during a waiting period after the first time interval; and the control unit causes the microwave source to supply microwaves, which have an average power of more than 400 W, preferably more than 600 W and advantageously more than 800 W, to the oven cavity during a second time interval, during which the total microwave energy supplied to the oven cavity exceeds 40 J per gram of food, preferably 60 J per gram of food and advantageously 90 J per gram of food.

BRIEF SUMMARY OF THE INVENTION

It is the object of the present invention to at least partially overcome the disadvantages of the prior art.

This object is achieved according to the features of the independent claims. Advantageous embodiments are set out in the dependent claims, the description and the drawings.

The object is achieved by a food treatment appliance, having a food treatment chamber, a food treatment chamber, at least one first function unit for treating food in the food treatment chamber and a second function unit for treating food in the food treatment chamber in the form of a low-frequency generation facility for introducing waves with a frequency of less than 902 MHz into the food treatment chamber.

The low-frequency generation facility of this food treatment appliance advantageously allows particularly effective and even defrosting of frozen food with relatively economical means. Low-frequency excitation utilizes the effect of dielectric loss to heat the food or item to be cooked, particularly of water, thereby allowing effective defrosting in particular. The at least one first function unit allows an additional or alternative treatment of food present in the food treatment chamber.

User convenience is also increased and further options result, in that food no longer has to be transferred between different specialized household appliances; instead all the process steps associated with the food in question can be performed in one appliance. A food treatment process can therefore be fully automatic and can be preset with or without user interaction.

It is therefore also advantageously possible to save space in a kitchen. Other household appliances that offer similar functions to the at least one first function unit can continue to carry out their main functions.

In one development the food treatment appliance is a household appliance, in particular a table-top appliance or an integrated appliance. This ensures a household end user has a particularly high degree of flexibility with regard to food treatment.

The low-frequency generation facility is designed in particular to generate waves of a lower frequency (also referred to in the following without loss of generality as "low-frequency waves") than the microwave frequency in the food treatment chamber.

The food treatment chamber in particular has a control facility, which can be used to actuate, in particular activate or operate, the at least one first function unit and the low-frequency generation facility independently of one another.

In one embodiment the at least one first function unit has a microwave generation facility for introducing microwaves with an associated microwave frequency into the food treatment chamber. This is suitable for heating food particularly quickly, in particular also cooking it. In the following cooking can refer to cooking in the narrower sense, heating food and/or keeping it warm.

The microwave generation facility can have a microwave generator, for example in the form of a magnetron or as a power semiconductor circuit, for generating microwaves. These can be introduced into the food treatment chamber directly or by way of a waveguide. The food treatment appliance is in particular sealed in respect of microwaves. To prevent the egress of microwaves out of the door, it can be covered with a metal grid and/or a door trap (microwave trap).

In one embodiment the at least one first function unit has at least one electrically operated resistance heating unit for heating the food treatment chamber. This advantageously provides a conventional oven function. The at least one electrically operated resistance heating unit can be configured or serve as a bottom heating unit, a top heating unit, a grill heating unit, a hot air heating unit (circular heating unit) etc. Defrosting can also be assisted by heating the food treatment chamber by activating the at least one resistance heating unit.

In one embodiment the at least one first function unit has a refrigeration unit and the food treatment chamber is a thermally insulated food treatment chamber. Because the food treatment chamber is thermally insulated, it can advantageously be cooled by the refrigeration unit, for example in the same manner as a refrigerator and/or freezer compartment. In particular the food treatment chamber can be cooled to a temperature in a temperature range between [+4° C. and +8° C.], in particular in a temperature range between [−4° C. and +8° C.], in particular in a temperature range between [−8° C. and +8° C.], in particular in a temperature range between [−12° C. and +8° C.], in particular in a temperature range between [−18° C. and +8° C.], in particular in a temperature range between [−24° C. and +8° C.], or even cooler. The food treatment appliance can also be designed to blast chill food present in the treatment chamber. The food treatment chamber can have a front loading opening, which can be closed by means of a door.

The use of a refrigeration unit advantageously allows space to be saved in a kitchen. For example it is not favorable to have a compartment specifically for defrosting in a freezer, as this restricts the usable storage space in the freezer, while the space in the present food treatment appliance is still available for defrosting, as a defrosting operation and/or cooking operation will only be started later and the appliance has therefore not yet been loaded. The same applies to blast chilling after cooking or cooling until the actual cooking process. "Defrosting" means in particular converting frozen water in the food to liquid water, which is typically achieved when the food reaches a temperature of approx. −2° C. to 0° C. However defrosting can also mean that the food reaches room temperature roughly. Heating food between approx. −2° C. to 0° C. and room temperature can also be referred to as "further thawing" and can be part of a defrosting sequence or even part of a heating or cooking sequence.

In one particularly advantageous embodiment the at least one first function unit comprises at least the microwave generation facility, the low-frequency generation facility and the refrigeration unit. This combination has the advantage that food can be treated in a particularly versatile manner; in particular frozen food can be kept cold, in particular frozen, and then be defrosted in a specific manner and optionally cooked.

In one embodiment the microwave frequency is 902 MHz or more, in particular 915 MHz or 2.45 GHz. This has the advantage that conventional microwave generation facilities can be used to generate the microwave radiation.

In one embodiment the low-frequency waves have a frequency of less than 500 MHz. This has the advantage that the water molecules in the frozen state can be excited particularly effectively.

In one development the low-frequency waves have a frequency, which is in one or more of the following frequency bands:
[6.765 MHz to 6.795 MHz]
[13.553 MHz to 13.567 MHz]
[26.957 MHz to 27.283 MHz]
[40.66 MHz to 40.70 MHz]
[433.05 MHz to 434.79 MHz].

The selection of such frequency bands has the advantage that they are available as ISM bands. The band [40.66 MHz to 40.70 MHz] in particular is advantageous for defrosting, as it produces particularly large dielectric losses in the water.

In one embodiment the low-frequency generation facility has a microwave generator. This has the advantage that it can bring about particularly powerful excitation of water in the frozen aggregate state. The low-frequency waves are therefore microwaves in this embodiment too. In this instance the food treatment appliance in particular has two microwave generation facilities; one for higher-frequency microwaves and one for low-frequency microwaves.

In one embodiment the low-frequency generation facility has an electromagnetic alternating field generator, which can be used to generate an electric and/or magnetic low-frequency alternating field in the food treatment chamber. Waves are introduced into the food treatment chamber here by introducing or generating the electric and/or magnetic alternating field in the food treatment chamber. Food being treated is penetrated and molecules, in particular water molecules, therein can be excited particularly effectively.

In one embodiment the electromagnetic alternating field generator has a number of capacitor plates that can be connected to an electric alternating voltage, with the food treatment chamber located in the space between. This allows an electric alternating field to be generated in the food treatment chamber, which penetrates the food to be treated and can specifically heat frozen food effectively. The capacitor plates in particular form a capacitor. The use of capacitor plates has the advantage that the resulting structure is particularly simple and economical and an excitation field can be applied to the food treatment chamber particularly evenly and extensively. Also practically no interfering field is generated outside the food treatment appliance. In one development the capacitor plates are electrically conductive plates arranged parallel to and at a distance from one another.

In an alternative or additional embodiment the electromagnetic alternating field generator has at least one coil that can be connected to an electric alternating voltage. This allows a magnetic alternating field to be generated in the food treatment chamber, which penetrates the food to be treated and can specifically heat frozen food effectively. The use of coils has the advantage that the resulting structure is particularly simple and economical and an excitation field can be applied to the food treatment chamber particularly evenly and extensively.

In one development at least one capacitor plate and/or at least one coil is arranged on at least one wall of the food treatment chamber, for example on a top, bottom, side wall and/or rear wall, etc. The capacitor plate and/or coil can be located in the food treatment chamber and/or outside the food treatment chamber.

In one development the at least one capacitor plate and/or coil takes up a large part (i.e. at least 75%, in particular at least 90%) of a surface of at least one wall, which allows particularly extensive application of an electric and/or magnetic alternating field to the food treatment chamber.

In one embodiment the capacitor plates and/or several coils have at least one first capacitor plate and/or coil, which is arranged above the food treatment chamber (e.g. on a top), and at least one second capacitor plate and/or coil, which is arranged below the food treatment chamber (e.g. on a bottom). This provides a particularly large surface for the capacitor plates and/or coils, allowing particularly extensive application of an electric and/or magnetic alternating field to the food treatment chamber. This in turn allows food to be defrosted particularly evenly. It also effectively prevents the egress of an electric and/or magnetic alternating field out of the food treatment appliance.

In one embodiment the low-frequency generation facility has an ultrasound generator. In this embodiment the low-frequency waves are therefore also ultrasound waves. This embodiment has the advantage that a usable frequency range for the low-frequency waves is not restricted by regulated or predefined ISM frequency bands.

In one embodiment the food treatment appliance comprises the electromagnetic alternating field generator and the ultrasound generator. This allows ultrasound waves to be generated in addition to the magnetic alternating field, allowing food to be defrosted particularly effectively.

In one embodiment the food treatment appliance has at least one detector for detecting a portion of the microwave radiation and/or the low-frequency waves used in the food treatment chamber as well as an evaluation facility, which is designed to reduce an energy of the lower-frequency waves and increase an energy of the microwaves, and vice versa, automatically based on the associated portion. This has the advantage that the food treatment appliance can switch automatically between defrosting and cooking. This embodiment utilizes the fact that the efficiency of low-frequency wave absorption drops as food defrosting progresses, while the efficiency of microwave absorption increases.

A portion used in the food treatment chamber can refer in particular to a portion of the microwave radiation or low-frequency waves absorbed in the food treatment chamber, in particular in a food in the food treatment chamber. The portion can be shown using different parameters, for example as the efficiency of microwave absorption, the degree of reflection of microwaves, the efficiency of low-frequency wave absorption, the efficiency of a coil and/or a capacitor formed by the capacitor plates, the power consumption of a coil and/or a capacitor formed by the capacitor plates, etc. or relationships between these (e.g. efficiency ratios). The unused portion can be used in the same way as the used portion.

The detector can be for example a microwave detector, a magnetic field sensor, an electric field sensor, an ammeter, a voltage meter, etc.

The introduction of the low-frequency wave and/or microwave radiation energy can comprise for example one or more of the following developments:

The introduction of lower-frequency waves is terminated when the used portion of said waves reaches or drops below a preset threshold value.

The introduction of microwaves is started when the used portion of low-frequency waves reaches or drops below a preset threshold value.

The introduction of microwaves is started when the used portion of microwaves reaches or exceeds a preset threshold value. Short test pulses of microwaves can be fed into the food treatment chamber and the portion of used microwaves can be determined therefrom, to establish whether the threshold value has been reached or exceeded.

The introduction of the low-frequency waves and the introduction of the microwaves can take place simultaneously at least for a time.

The introduction of the low-frequency waves and/or the introduction of the microwaves can take place as a function of the value of the associated portion or a portion ratio, etc. for example in proportion thereto.

Generally at least one electric resistance heating unit can be activated in the same way as, in particular also in addition to, the introduction of microwaves.

In one embodiment that is particularly simple to implement the food treatment appliance has an evaluation facility, which is designed to terminate the introduction of lower-frequency waves and then start the introduction of microwaves and/or the activation of at least one electric resistance heating unit based on the portion.

In one embodiment the food treatment appliance is designed to run a food treatment program, in which the food treatment chamber is initially kept in a freezing state, then a defrosting program segment is activated, in which the freezing state is terminated and at least the lower-frequency waves are introduced into the food treatment chamber and then a cooking program segment is optionally activated, in which only microwaves are introduced into the food treatment chamber. This food treatment program has the advantage that food is stored in the food treatment appliance and can then be defrosted and optionally cooked at a specific time. The food treatment program can in particular run automatically.

In one embodiment the food treatment appliance is designed to activate at least the defrosting program segment based on a time preset by the user. This embodiment is particularly user-friendly. For example, before leaving home, a user can place food in the food treatment chamber where it is initially kept frozen or it is frozen. At the time preset by the user the food is defrosted and then optionally cooked so, when the user returns, s/he finds the food already defrosted or optionally cooked.

In one embodiment the time preset by the user is any time, which is then permanently selected. This has the advantage that the food treatment program can be performed without further user interaction. The time preset by the user can be a time input by the user into the food treatment appliance. In one development therefore the time preset by the user is a time preset before the start of the food treatment program.

In an alternative or additional embodiment the time preset by the user can be preset by said user during the course of the defrosting program segment. This has the advantage that the end of defrosting and optionally cooking can be tailored more precisely to user requirements. This is the case in particular if the food treatment appliance has a network interface and is designed to be controlled remotely by way of the network interface. A command can be received from a user by way of the network interface to switch from the freezing program segment to the defrosting program segment or to start the defrosting program segment. The time preset by the user can therefore be preset in a flexible manner. In one use scenario, before leaving home, a user can place food in the food treatment chamber where it is initially kept frozen or it is frozen. When the user is on the way back home, s/he can start the defrosting program segment at any time, for example when s/he knows that s/he is only ten minutes from home.

The food treatment operations described above can be followed by one or more of the following food treatment operations for example:
keeping warm,
chilling,
keeping cool, and/or
freezing, in particular blast chilling.

Generally the food treatment appliance can be configured at least to perform the functions of freezing, cooling, defrosting and cooking (optionally including heating and/or keeping warm) and to have corresponding measuring, regulating and control facilities.

In one development the food treatment appliance can have a steam generation apparatus for supplying steam to the food treatment chamber. This advantageously allows food to be steam-treated. Defrosting can also be assisted by the introduction of in particular warm or hot steam.

The object is also achieved by a method for operating a food treatment appliance as described above, in which
a defrosting program segment is activated, in which at least the lower-frequency waves are introduced into the food treatment chamber, and then
a cooking program segment is activated, in which at least predominantly microwaves are introduced into the food treatment chamber.

The method can be configured in the same manner as the food treatment appliance and has the same advantages.

BRIEF DESCRIPTION OF THE DRAWINGS

The properties, features and advantages of the present invention as described above as well as the manner in which they are achieved will become clearer and more readily understandable in conjunction with the following schematic description of an exemplary embodiment, which is described in more detail in conjunction with the drawing.

FIG. 1 shows a sectional front view of an outline of a food treatment appliance 1, which has a thermally insulated food treatment chamber 2, a refrigeration unit 3 for cooling the food treatment chamber 2, a microwave generation facility 4 for introducing microwaves with an associated microwave frequency into the food treatment chamber 2 and a low-frequency generation facility in the form of an electromagnetic alternating field generator 5 for generating an alternating field with a lower frequency than the microwave frequency in the food treatment chamber 2. The alternating field generator 5 is connected to an alternating voltage source (not shown) for this purpose.

DETAILED DESCRIPTION OF EXEMPLARY EMBODIMENTS OF THE PRESENT INVENTION

The microwave generation facility 4 generates microwaves with a microwave frequency of for example 915 MHz or 2.45 GHz, which are then guided into the food treatment chamber 2, in particular in the region of a top 6 of a wall 7 delimiting the food treatment chamber 2.

The alternating field generator 5 has a first capacitor plate 8 and/or a first coil 8 and a second capacitor plate and/or a second coil 9, between which the food treatment chamber 2 is located. In the present instance the first capacitor plate or coil 8 is arranged along the top 6 and the second capacitor plate or coil 9 is arranged along a bottom 10 of the wall 7. They take up at least 75% of the respective surfaces of top 6 and bottom 10.

The food treatment appliance 1 is designed to supply alternating current to the capacitor plates or coils 8, 9 so that these generate an electric or magnetic alternating field, which fills the food treatment chamber 2. The electric or magnetic alternating field can in particular have a frequency, which is in one or more of the following frequency bands:
[6.765 MHz to 6.795 MHz]
[13.553 MHz to 13.567 MHz]
[26.957 MHz to 27.283 MHz]
[40.66 MHz to 40.70 MHz]
[433.05 MHz to 434.79 MHz].

The food treatment appliance 1 can also have an ultrasound generator 11, which can be used to introduce ultrasound waves into the food treatment chamber 2.

The food treatment appliance 1 can also have detector 12 for detecting a portion of the microwave radiation used in the food treatment chamber 2 and/a detector 13 for detecting a portion of the electric or magnetic alternating field used in the food treatment chamber 2. The detector 12 can be integrated in the microwave generation facility 4. The detector 13 can be integrated in the alternating field generator 5.

The detectors 12, 13 are coupled to an evaluation facility 14, which is designed to automatically reduce a strength or energy of the electromagnetic field and increase an introduced microwave energy, or vice versa, based on portion. The evaluation facility 14 can be designed in particular to terminate the introduction of lower-frequency waves and start the introduction of microwaves based on portion. The evaluation facility 14 can be coupled to a control facility 15, which is designed to control the food treatment appliance 1, in particular operation of the refrigeration unit 3, the microwave generation facility 4 and the alternating field generator 5. The evaluation facility 14 can also be integrated in the control facility 15.

The food treatment appliance 1, in particular its control facility 15, is designed to run a food treatment program, in which the food treatment chamber 2 is initially kept in a freezing state, then a defrosting program segment is activated, in which the freezing state is terminated and at least the lower-frequency waves are introduced into the food treatment chamber 2, and then a cooking program segment is activated, in which only the microwaves are introduced into the food treatment chamber 2. This time preset by the user can be any time, which is then permanently selected and can be programmed into the food treatment appliance 1 by way of an operating facility (not shown) of the food treatment appliance 1, for example, or by way of an external entity such as a smartphone, etc. Additionally or alternatively the time preset by the user can be preset by the user during the course of the defrosting program segment. This can be performed based on receipt of a corresponding external command.

To communicate with an external entity, for example a mobile user terminal such as a notebook, smartphone, etc., the food treatment appliance 1 can have a corresponding wireless and/or wired interface, in particular a network interface 16. The network interface 16 is coupled to the control facility 15 and is configured in particular for bi-directional data transmission with the external entity. The network interface 16 can be for example a WLAN adapter, an Ethernet adapter, etc.

Two possible application scenarios are described in more detail in the following:

A) A user stores a deep-frozen chicken (in a cook pot for later) in the food treatment appliance at freezing temperatures, while enjoying a holiday lasting several weeks. After a delayed (therefore not precisely schedulable) return, s/he spontaneously starts the defrosting and cooking operation (by app) from the airport, said operation being relatively rapid due to the rapid and food-friendly first defrosting stage at frequencies <902 MHz (approx. 20 mins rather than 1 h with conventional heating units) and switching seamlessly to the heating operation using microwaves when the melting point of ice has been reached (defrosting from −18° C. to approx. −2° C. is performed more effectively with low frequencies in the alternating field of the capacitor plates, while further thawing and heating are performed more effectively with high microwave frequencies). When the user arrives home, the chicken is cooked and ready to eat, without having to be moved anywhere in the process.

B) The user spontaneously decides s/he wants meatloaf and finds 1 kg of mince in the freezer compartment. Defrosting takes quite a long time with conventional heat and some time even with microwaves if parts are not to be cooked on the outside in the process. The use of low-frequency waves and optionally the deployment of microwaves already mean the mince can be defrosted and heated very quickly to its processing temperature of 20° C. While the meatloaf is in the appliance the user is suddenly called away and cannot terminate the cooking operation. In this instance the appliance completes the cooking operation and cools the meatloaf until the user can eat it the next day or freezes the finished meatloaf immediately if longer storage is required.

The present invention is of course not restricted to the illustrated exemplary embodiment.

Generally "one", etc. can refer to one or a number, in particular in the sense of "at least one" or "one or more", etc., unless this is specifically excluded, for example by the expression "just one", etc.

A number can also refer to just the cited number as well as a standard tolerance range, unless this is specifically excluded.

The invention claimed is:

1. A food treatment appliance, comprising:
a food treatment chamber;
a first function unit for treating food in the food treatment chamber;
a second function unit for treating food in the food treatment chamber, said second function unit being configured in the form of a low-frequency generation facility for introducing low-frequency waves with a frequency of less than 902 MHz into the food treatment chamber;
a detector for detecting a used portion of the low-frequency waves used in the food treatment chamber; and
an evaluation facility configured to reduce the introduction of the low-frequency waves and to activate the first function unit automatically based on the detected used portion being below a preset threshold value.

2. The food treatment appliance of claim 1, wherein the first function unit includes a microwave generation facility for introducing microwaves with an associated microwave frequency into the food treatment chamber.

3. The food treatment appliance of claim 1, wherein the first function unit includes an electrically operated resistance heating unit.

4. The food treatment appliance of claim 1, wherein the first function unit includes a refrigeration unit, said food treatment chamber being a thermally insulated food treatment chamber.

5. A food treatment appliance, comprising:
a thermally insulated food treatment chamber;
a refrigeration unit;
a microwave generation facility configured to introduce microwaves with an associated microwave frequency into the food treatment chamber;
a low-frequency generation facility configured to introduce into the food treatment chamber low-frequency waves with a frequency which is lower than the microwave frequency;
a detector for detecting a used portion of the low-frequency waves used in the food treatment chamber; and
an evaluation facility configured to reduce the introduction of the low-frequency waves and to increase a power of the microwave generation facility automatically based on the detected used portion being below a preset threshold value.

6. The food treatment appliance of claim 5, wherein the microwave frequency is 902 MHz or more, in particular 915 MHz, or 2.45 GHz.

7. The food treatment appliance of claim 5, wherein the low-frequency waves have a frequency of less than 500 MHz, in particular a frequency which is in one or more of the following frequency bands:
[6.765 MHz to 6.795 MHz]
[13.553 MHz to 13.567 MHz]
[26.957 MHz to 27.283 MHz]
[40.66 MHz to 40.70 MHz]
[433.05 MHz to 434.79 MHz].

8. The food treatment appliance of claim 5, wherein the low-frequency generation facility includes a microwave generator.

9. The food treatment appliance of claim 5, wherein the low-frequency generation facility includes an electromagnetic alternating field generator configured to generate an electric and/or magnetic low-frequency alternating field in the food treatment chamber.

10. The food treatment appliance of claim 9, wherein the electromagnetic alternating field generator includes a number of capacitor plates connectable to an electric alternating voltage, said food treatment chamber located in a space between the capacitor plates.

11. The food treatment appliance of claim 10, wherein at least one of the capacitor plates is arranged above the food treatment chamber, and at least another one of the capacitor plates is arranged below the food treatment chamber.

12. The food treatment appliance of claim 9, wherein the electromagnetic alternating field generator includes a coil connectable to an electric alternating voltage.

13. The food treatment appliance of claim 12, wherein the coil is arranged above the food treatment chamber, said electromagnetic alternating field generator including another coil connectable to an electric alternating voltage and arranged below the food treatment chamber.

14. The food treatment appliance of claim 5, wherein the low-frequency generation facility includes an ultrasound generator.

15. The food treatment appliance of claim 9, further comprising an ultrasound generator configured to introduce ultrasound waves into the food treatment chamber.

16. The food treatment appliance of claim 5, constructed to run a food treatment program which when executed causes:
- the food treatment chamber to be initially kept in a freezing state,
- activation of a defrosting program segment to terminate the freezing state and to introduce the low-frequency waves into the food treatment chamber, and then
- activation of a cooking program segment to predominantly introduce only microwaves into the food treatment chamber.

17. The food treatment appliance of claim 5, constructed to enable a user to preset a time, which is random and then permanently selected.

18. The food treatment appliance of claim 17, wherein the time is preset by the user during execution of the defrosting program segment.

19. The food treatment appliance of claim 5, wherein the microwave generation facility introduces the microwaves into the food treatment chamber simultaneously with the low-frequency generation facility introducing the low-frequency waves into the food treatment chamber.

\* \* \* \* \*